US011834009B2

(12) United States Patent
Gaucher et al.

(10) Patent No.: US 11,834,009 B2
(45) Date of Patent: Dec. 5, 2023

(54) END FITTING FOR MOTOR VEHICLE WIPER BLADE

(71) Applicant: Valeo Systèmes d'Essuyage, Le Mesnil Saint Denis (FR)

(72) Inventors: Vincent Gaucher, Issoire (FR); Quentin Fauriol, Issoire (FR); Nicolas Kuchly, Issoire (FR); Loic Roussel, Issoire (FR)

(73) Assignee: Valeo Systèmes d'Essuyage, Le Mesnil-Saint Denis (FR)

( * ) Notice: Subject to any disclaimer, the term of this patent is extended or adjusted under 35 U.S.C. 154(b) by 0 days.

(21) Appl. No.: 17/637,743

(22) PCT Filed: Jul. 20, 2020

(86) PCT No.: PCT/EP2020/070494
§ 371 (c)(1),
(2) Date: Feb. 23, 2022

(87) PCT Pub. No.: WO2021/037440
PCT Pub. Date: Mar. 4, 2021

(65) Prior Publication Data
US 2022/0281416 A1 Sep. 8, 2022

(30) Foreign Application Priority Data

Aug. 30, 2019 (FR) ...................................... 1909605

(51) Int. Cl.
*B60S 1/34* (2006.01)
*F16L 3/02* (2006.01)
(Continued)

(52) U.S. Cl.
CPC ............ *B60S 1/3415* (2013.01); *B60S 1/3468* (2013.01); *F16B 2/22* (2013.01); *F16L 3/02* (2013.01); *B60S 1/3465* (2013.01); *B60S 1/522* (2013.01)

(58) Field of Classification Search
CPC ........ B60S 1/522; B60S 1/524; B60S 1/3465; B60S 1/3415; B60S 1/3468; F16L 3/00;
(Continued)

(56) References Cited

U.S. PATENT DOCUMENTS 2,984,419 A * 5/1961 McOuat .................... B05B 7/04
239/428
3,803,664 A * 4/1974 Triplett ................... B60S 1/522
248/231.81
(Continued)

FOREIGN PATENT DOCUMENTS

| EP | 2591958 A1 | 5/2013 |
| WO | 2019/134756 A1 | 7/2019 |

OTHER PUBLICATIONS

International Search Report and Written Opinion issued in corresponding International Patent Application No. PCT/EP2020/070494, dated Oct. 9, 2020 (10 pages).
(Continued)

*Primary Examiner* — Gary K. Graham
(74) *Attorney, Agent, or Firm* — Osha Bergman Watanabe & Burton LLP

(57) ABSTRACT

The invention relates to a mounting bracket (5) for a pipe (4) supplying fluid to a driving arm (1) of a motor vehicle wiper system (100), the driving arm (1) comprising at least one spring (14), the mounting bracket (5) comprising at least one sleeve (51) configured to hold the supply pipe (4). The mounting bracket (5) according to the invention comprises a substantially hollow cylindrical body (50) linked to the sleeve (51) and configured to be inserted into a space (141)

(Continued)

surrounded by the spring (14) of the driving arm (1). The invention also relates to a driving arm (1) comprising such a mounting bracket (5) and to a method for assembling such a driving arm (1), comprising a preliminary step of inserting the body (50) of such a mounting bracket (5) into at least part of the aforementioned space (141).

10 Claims, 4 Drawing Sheets

(51) Int. Cl.
*F16B 2/22* (2006.01)
*B60S 1/52* (2006.01)

(58) Field of Classification Search
CPC ....... F16L 3/02; F16L 3/08; F16L 3/10; F16L 3/1033; F16L 3/1041; F16B 2/22
USPC ......................................... 15/250.04; 248/75
See application file for complete search history.

(56) References Cited

U.S. PATENT DOCUMENTS

| | | | | |
|---|---|---|---|---|
| 3,906,582 | A * | 9/1975 | Graczyk | B60S 1/522 |
| | | | | 15/250.04 |
| 4,005,883 | A * | 2/1977 | Guest | F16L 37/0927 |
| | | | | 285/369 |
| 4,444,358 | A * | 4/1984 | Spohn | B60S 1/50 |
| | | | | D8/395 |
| 5,349,719 | A | 9/1994 | Egner-Walter | |
| 5,430,909 | A * | 7/1995 | Edele | B60S 1/3415 |
| | | | | 15/250.04 |
| 2013/0111689 | A1* | 5/2013 | Picot | B60S 1/524 |
| | | | | 15/250.04 |
| 2018/0354463 | A1* | 12/2018 | Jarasson | B60S 1/3415 |

OTHER PUBLICATIONS

Office Action issued in counterpart Chinese Patent Application No. CN 202080074844.4 dated Sep. 29, 2023 (8 pages).

* cited by examiner

[Fig. 1]
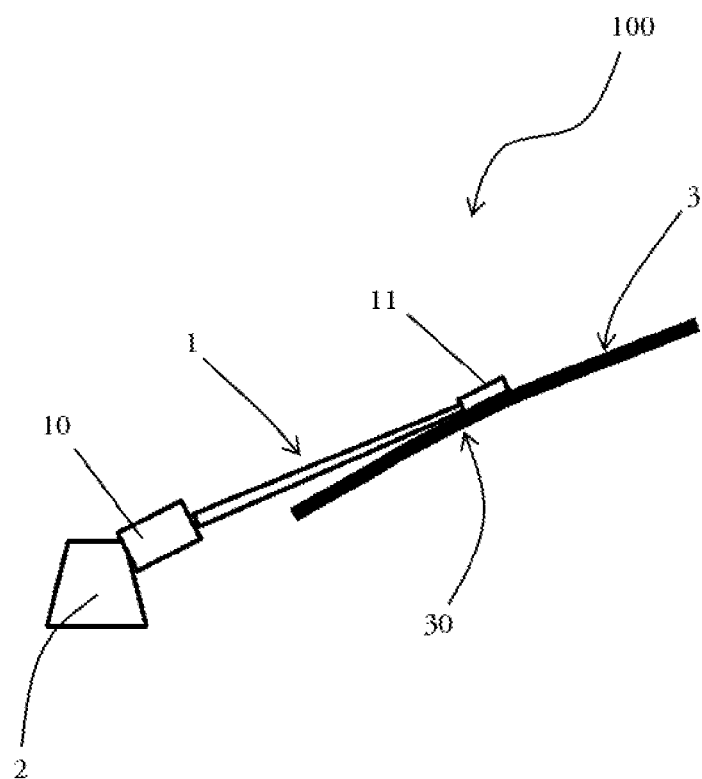

[Fig. 2]
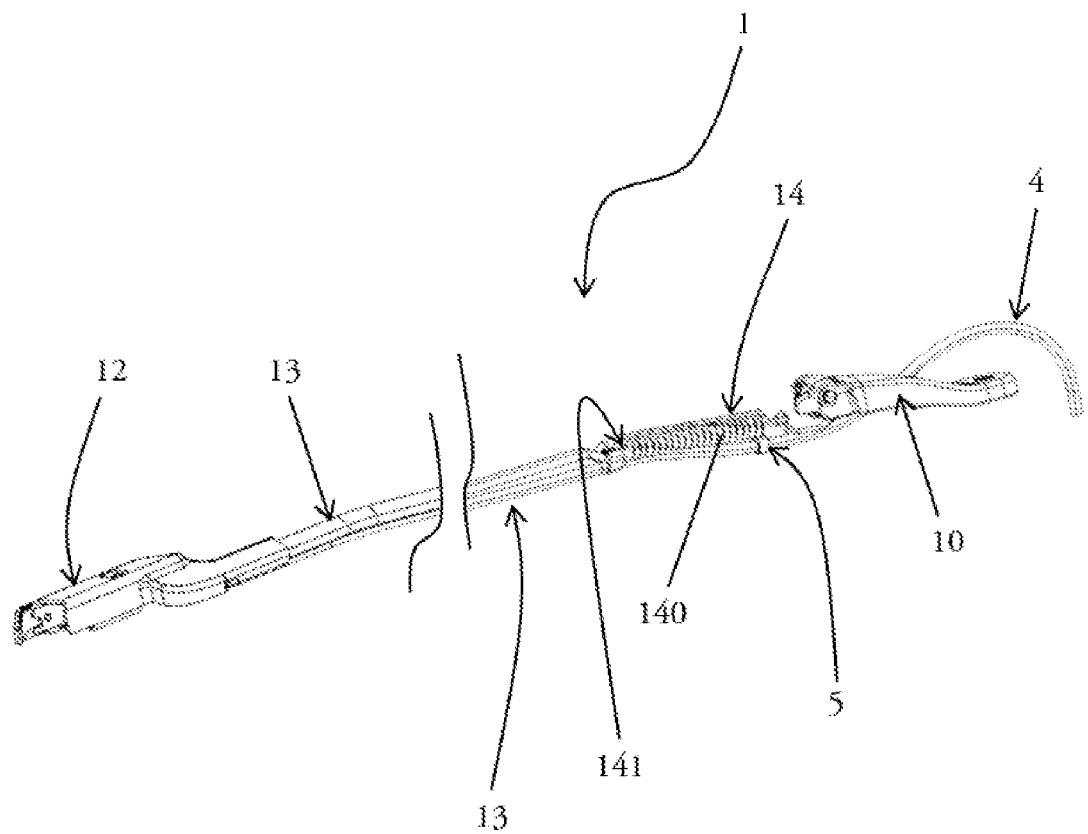

[Fig. 3]
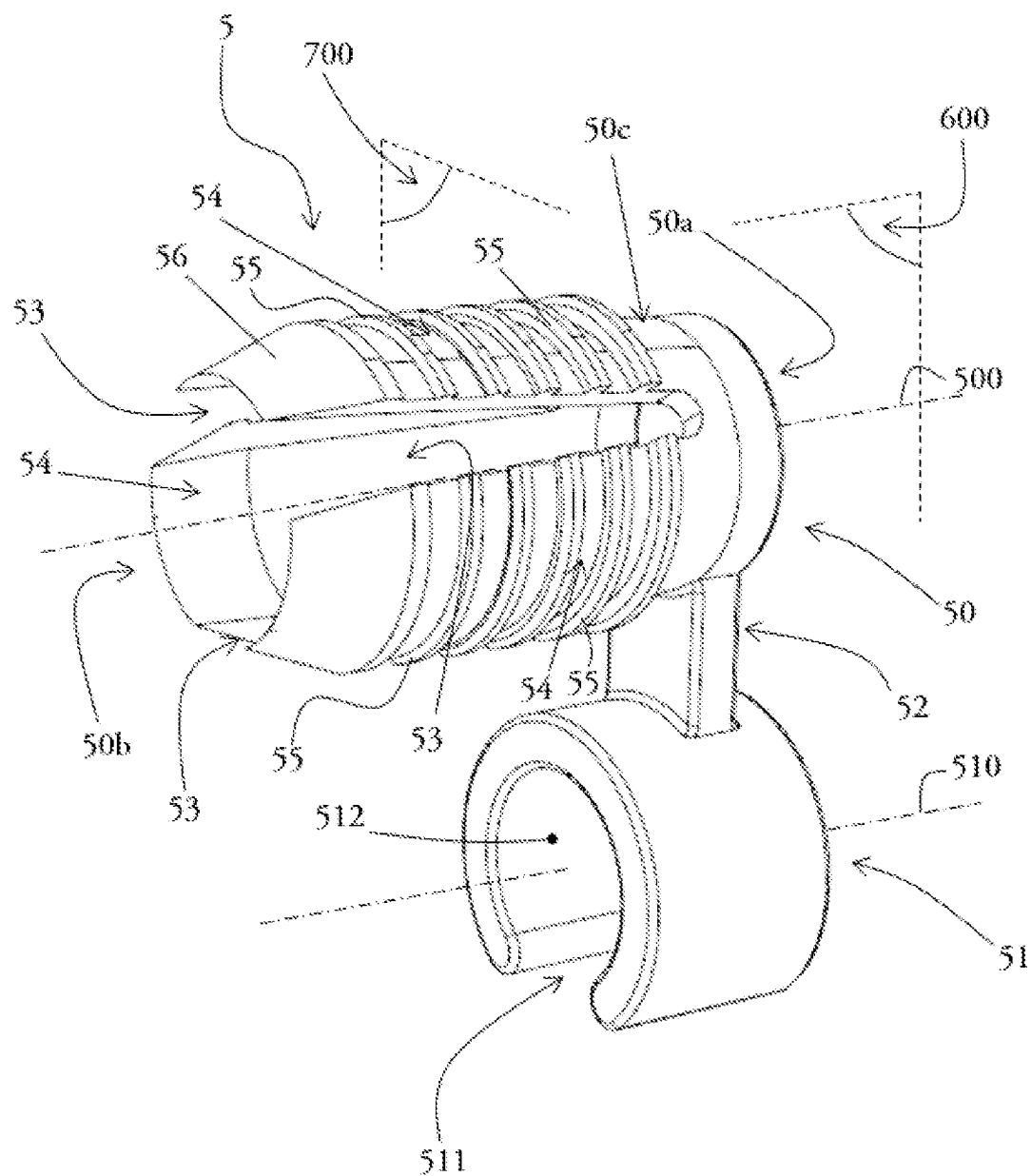

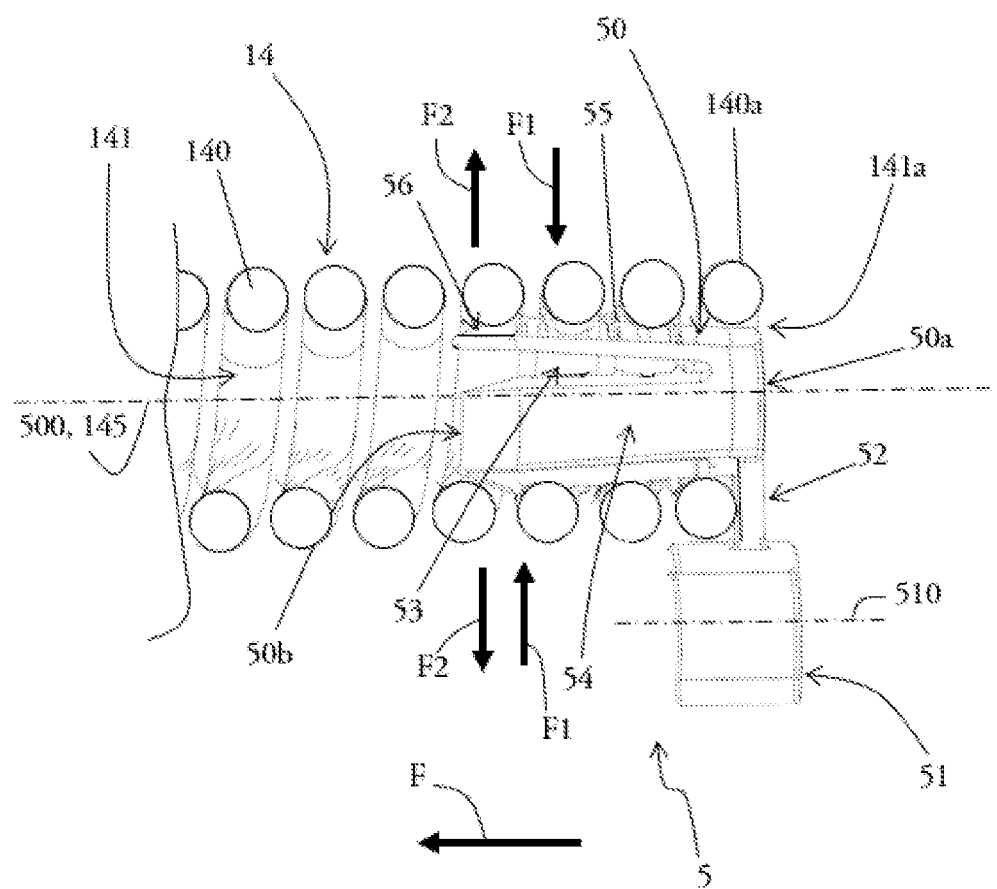
[Fig. 4]

END FITTING FOR MOTOR VEHICLE WIPER BLADE

The invention relates to the field of wiping and/or cleaning glazed surfaces of a motor vehicle.

Wiper systems for motor vehicles generally comprise at least one drive arm which performs an angular back-and-forth movement in front of a surface to be wiped, such an arm driving at least one windshield wiper comprising a wiper blade made of a flexible material and held against the surface to be wiped. The windshield wiper is attached to the drive arm of the wiper system by a connection assembly which is configured such that, driven by the movements of the wiper and the arm, the wiper blade rubs against the surface to be wiped and sweeps the water and some of the dirt therefrom so as to remove them from the driver's field of view.

The drive arm comprises a driver via which it is linked to a drive device configured to impart the angular back-and-forth movement mentioned above to the drive arm. The drive arm also comprises an end via which it is linked to the windshield wiper, this end comprising in particular a yoke which receives the connection assembly between the drive arm and the windshield wiper. The drive arm further comprises a rod that connects the yoke to the driver. Between the rod and the driver there is disposed a spring which has the main role of ensuring permanent contact between the windshield wiper and the surface to be wiped against which the latter is held. In other words, the spring is configured to impart a bearing force on the surface to be wiped to the windshield wiper, which force is both strong enough to prevent the wiper blade from moving away from the surface to be wiped when the vehicle is moving, for example at high speed, and adapted such that the rubbing of the wiper blade on the surface to be wiped makes the desired wiping possible without excessive effort on the part of the driver.

The invention relates more particularly to such wiper systems equipped with means for spraying a fluid for cleaning the surface to be wiped. According to various embodiments, such spraying means may be, for example, positioned on the windshield wiper itself, or at the end of the drive arm. In general, the cleaning fluid is conveyed to the windshield wiper by at least one tube which extends in part along the drive arm.

To avoid excessive wear, such a tube must not come into contact with the surface to be wiped when the wiper blade is moving. Furthermore, for esthetic reasons, it is preferable for such a tube to remain out of sight of the occupants of the vehicle and to be as inconspicuous as possible from outside the vehicle. One solution consists in fixing the tube to the drive arm by means of a device which comprises, on one end, means for retaining the tube, and, on the other end, means for fixing to the drive arm, for example by elastic snap-fastening. The means for fixing the tube to the drive arm are however often voluminous, and sometimes require the use of a specific assembly tool due to the configuration and bulk of the drive arm. Furthermore, the means known in the prior art for fixing the tube to the drive arm are specific to each drive arm, thus increasing the efforts needed to design, manufacture, reference and store these various means for fixing the tube.

The object of the present invention is to provide a simple solution, which is less bulky and less expensive than the solutions known in the prior art, for fixing a flexible tube as mentioned above on a drive arm of a wiper system for a motor vehicle.

To that end, according to a first aspect, the invention relates to a bracket for fixing a fluid delivery tube to a drive arm of a wiper system of a motor vehicle, the drive arm comprising at least one spring, the fixing bracket comprising at least one sleeve configured to retain the delivery tube, the fixing bracket comprising a cylindrical body that is linked to the sleeve and is configured to be inserted in a volume surrounded by the spring of the drive arm.

It is necessary to understand here that the spring of the drive arm is a wound-coil spring, and that the volume surrounded by the spring of the drive arm is the volume delimited by all the wound coils of such a spring. This volume is therefore substantially cylindrical, and it is therefore necessary to understand that the body of the fixing bracket according to the invention is configured to be inserted in at least part of this volume, the fluid delivery tube remaining outside the latter, preferably along the latter.

It is also appropriate here for a distinction to be made between the volume of the spring of the drive arm, as defined above, and a volume of the body of the fixing bracket, which volume is delimited by the substantially cylindrical wall of the latter. According to the invention, the coils of the spring together delimiting the volume of the spring surround an outer surface of the body of the fixing bracket, that is to say a surface of the latter that is located, in a radial direction perpendicular to the axis of the substantially cylindrical shape of the body, outside the body of the mounting bracket.

Through the abovementioned insertion of the body of the fixing bracket in at least part of the volume of the spring of the drive arm, the invention makes it possible to significantly reduce the bulk of the fixation of a delivery tube as mentioned above to a drive arm of a wiper system in a motor vehicle: the invention therefore successfully achieves at least one of the aims it had set itself.

According to one example, the cylindrical body is hollow. Its center thus has a widening which gives it a certain flexibility so as to permit it to be inserted in the volume delimited by the internal wall of the coils of the spring.

Advantageously, the fixing bracket according to the invention is made by injecting a synthetic material into a mold. In addition to the low cost of such manufacture, the use of a synthetic material, combined with a particular hollow configuration of the body of the fixing bracket, imparts elastic deformability to the body of the fixing bracket according to the invention, in particular in radial directions that are perpendicular to the longitudinal direction of elongation of the body of the fixing bracket. This allows such a fixing bracket to be used with various types of drive arm springs, in particular springs that have a volume with different diameters. The fixing bracket is thus standardized for utilization with multiple types of drive arm.

The invention may also have one or more of the following features, considered separately or in combination:

The sleeve extends in a main direction substantially parallel to that of the body of the fixing bracket. In the following text, the longitudinal direction of the body of the fixing bracket will be referred to as the direction of the axis of the cylindrical shape of the body. By extension, this direction will also be referred to below as the longitudinal direction of the fixing bracket according to the invention and of the elements which constitute it. In the fixing bracket according to the invention, the sleeve therefore extends mainly in a direction substantially parallel to the abovementioned longitudinal direction.

In one example of the invention, the sleeve is attached to the body of the fixing bracket at one end, in the above-defined longitudinal direction of the latter. In the following text, this end will be arbitrarily referred to as the rear end of the body of the fixing bracket according to the invention, and, by extension, as the rear end of the fixing bracket according to the invention. With reference to this designation, the front end of the body of the fixing bracket and, by extension, the front end of the fixing bracket according to the invention will be referred to as the opposite end, in the longitudinal direction, from the abovementioned rear end. As a result of the above, in a drive arm of a wiper system equipped with a fixing bracket according to the invention, the body of the fixing bracket is inserted in a volume of a spring of the drive arm in such a way that its front end is located within the abovementioned volume, and that its rear end, provided with the abovementioned sleeve, is flush with an engagement end of the spring, that is to say that end of this spring via which the body of the fixing bracket is inserted in the volume of the spring.

According to an advantageous embodiment, the sleeve has the overall shape of a hollow cylinder, the axis of which is parallel to the longitudinal axis of the body of the fixing bracket, and this hollow cylinder has an opening which extends longitudinally from one of its longitudinal ends to the other. Advantageously, an inside diameter of the cylinder formed by the sleeve is complementary to an outside diameter of a cleaning-fluid delivery tube as mentioned above, in such a way that the elasticity of the material used to make the fixing bracket according to the invention makes it possible to retain the cleaning-fluid delivery tube by snap-fastening in the hollow cylinder formed by the abovementioned sleeve. In one example, the sleeve of the fixing bracket according to the invention is attached to the body thereof via a base which extends from the rear end of the body, substantially perpendicularly to the longitudinal direction of the latter.

The body of the fixing bracket has a substantially conical shape. More specifically, the invention provides that a diameter of the body of the fixing bracket increases, in the longitudinal direction, from the rear end of the body up to that end of the latter that is on the opposite side, in the longitudinal direction. In other words, a perimeter of the body of the fixing bracket according to the invention, measured in a plane perpendicular to the longitudinal axis of the latter, increases from the rear end toward the front end thereof. With reference to the above, this makes it easier to lock the fixing bracket within the volume of springs that have a different internal diameter.

The body of the fixing bracket comprises at least one longitudinal slot configured to give it radial elasticity. More specifically, the abovementioned longitudinal slot extends, in the longitudinal direction of the fixing bracket, from the front end of the body of the fixing bracket and in a plane perpendicular to the longitudinal axis of the body of the fixing bracket, and it occupies a fraction of the perimeter of this body. More precisely still, this slot opens out at the front longitudinal end of the body of the fixing bracket, that is to say it extends over an angular fraction of the perimeter of the front end of the body of the fixing bracket according to the invention.

In one example of this embodiment, a dimension, measured in the longitudinal direction defined above, of the longitudinal slot is smaller than a longitudinal dimension of the body of the fixing bracket.

According to one exemplary embodiment, the fixing body comprises a plurality of longitudinal slots. For example, there are three abovementioned longitudinal slots. However many there are, these longitudinal slots are advantageously evenly distributed angularly around the circumference of the body of the fixing bracket according to the invention, that is to say about the longitudinal axis thereof. Advantageously, the longitudinal slot(s) have/has a shape that widens from their/its rear end, located close to the rear end of the body of the fixing bracket, to their/its front end, which opens out at the front end of the abovementioned body. The result of the above is that the longitudinal slots between them define fingers in the body of the fixing bracket according to the invention, and that the presence of these longitudinal slots, combined with the elasticity of the material which forms the fixing bracket according to the invention, permits radial movements of these fingers. In other words, under the effect of stress directed radially toward the longitudinal axis of the body and exerted from the outside toward the inside of the latter, the presence of longitudinal slots allows the fingers to move closer to the longitudinal axis of the body and therefore to one another, thereby reducing an outside diameter of the body of the fixing bracket. This makes it possible, in particular, to facilitate the insertion of the body of the fixing bracket in the interior volumes of drive arm springs having different diameters, thus increasing the possible uses of the fixing bracket according to the invention. This aspect also ensures that there is a sufficient securing force between the body of the fixing bracket and the spring.

In a rest position of the fixing bracket, a diameter of the body of the fixing bracket, measured at a front longitudinal end of the latter, is greater than a diameter of the body measured at a rear longitudinal end of the latter. Here, it is necessary to understand that the rest position of the fixing bracket according to the invention is a position in which the body of the latter is outside the volume of a spring of a drive arm of a wiper system. By contrast, the working position of the fixing bracket is a position in which the body of the latter is inserted in at least part of a volume of such a spring. According to the invention, the dimensions of the body of the fixing bracket are defined in such a way that an outside diameter of the body, close to the front end thereof, is greater than a diameter of the volume of a spring in which the body of the fixing bracket is to be inserted.

The body comprises a plurality of radially arranged peripheral ribs. More specifically, the invention provides that these peripheral ribs are arranged protruding from an outer wall of the body of the fixing bracket, that is to say from a wall of this body that is intended to be positioned against an internal wall of a spring of a drive arm. These peripheral ribs are, for example, perpendicular to the axis of the body and parallel to one another. According to one example, they are arranged, in the longitudinal direction, over a dimension substantially equal to a longitudinal dimension of at least one longitudinal slot. In other words, these peripheral ribs are arranged between the front end of the body of the fixing bracket and a rear end of the longitudinal slot described above. These ribs may form rings which emerge from the external wall of the body, such that they act as elements for retention in the volume of the spring.

One longitudinal end of the body comprises a bevel. More specifically, the abovementioned bevel is arranged at the front end of the body of the fixing bracket. That is to say that, at its front longitudinal end, the wall of the body of the fixing bracket according to the invention has substantially the shape of a cone frustum, the smallest outside diameter of which is that of the front end of the body.

Advantageously, this bevel is made by thinning the outer wall of the body. The role of such a bevel is in particular to facilitate the engagement of the front end of the body of the fixing bracket in the above-defined volume of a spring of a drive arm. Furthermore, the configuration of such a bevel allows the stress exerted on the front end of the body when the latter engages in the abovementioned volume to be exerted radially, the result of which is that the fingers defined by the longitudinal slots described above move closer to the longitudinal axis of the body, and, therefore, the diameter of the latter is reduced, facilitating the insertion of the latter in the abovementioned volume.

The invention also extends, according to a second aspect, to a drive arm of a wiper system for a motor vehicle, comprising in particular a driver configured to be linked to a device for driving the drive arm, an end configured to receive a windshield wiper of the wiper system, the drive arm comprising a spring linked, on one end, to the driver and, on the other end, to a rod connected to the end that is configured to receive a windshield wiper, the drive arm comprising a tube for delivering a cleaning fluid to the windshield wiper of the wiper system, characterized in that the drive arm comprises a bracket for fixing the delivery tube as has just been described.

Advantageously, the spring of such a drive arm is a wound-coil spring, all of the coils of which delimit, by surrounding it, a volume of the spring in at least part of which the body of the fixing bracket is to be inserted.

With reference to the orientations and designations defined above, in such a drive arm, the installation of the fixing bracket as described above is first of all carried out by engaging the front longitudinal end of the body of the fixing bracket in an engagement end of the above-defined volume of the spring of the drive arm, in such a way that the longitudinal axis of the body of the fixing bracket and the longitudinal axis of the volume of the spring, which is substantially cylindrical, substantially coincide. According to an advantageous but not exclusive example, the engagement end of the volume of the spring is that which is, in a main direction of extent of the spring, closest to that end of the drive arm via which the latter is connected to the driver of a wiper system as mentioned above.

The engagement of the front end of the body of the fixing bracket in the volume of the spring is, as described above, facilitated by the presence and by the configuration of the bevel arranged at the front end of the body. In addition, the result of the above is that the stress exerted radially on the body when it engages in the volume of the spring has the effect of moving the above-defined fingers of this body closer to the longitudinal axis of the fixing bracket, and therefore of reducing the outside diameter of this body and of facilitating its insertion in the abovementioned volume.

The installation of the fixing bracket in the spring of the drive arm continues with a relative translational movement of the body toward the inside of the volume of the spring. This translational movement is performed in the longitudinal direction of the body of the fixing bracket. During this translational movement, the result, for the one part, of the substantially conical shape of the body and its dimensions, which are described above, and, for the other part, of the radial elasticity imparted by the longitudinal slots arranged in the body of the fixing bracket and also the flexibility of the material used to make the fixing bracket, is that the fingers defined by the abovementioned longitudinal slots move radially toward the longitudinal axis of the body of the fixing bracket so as to fit the outside diameter of the latter to the diameter of the inner volume of the spring. Moreover, the result of the radial elasticity imparted by the abovementioned longitudinal slots, and also of the natural elasticity of the material used to make the fixing bracket, is that the abovementioned fingers have a natural tendency to move away from one another so as to return to the position occupied by them in the above-defined rest position of the fixing bracket, thus resulting in the body of the fixing bracket being locked in the volume of the spring.

The translational movement of the body of the fixing bracket inside the spring continues until the rear end of the fixing bracket, to which the sleeve described above is attached, butts against that coil of the spring that is located at the engagement end of the volume thereof. In the example described above, in which the sleeve of the fixing bracket is attached to the body of the latter via a base which extends from the rear end of the body, substantially perpendicularly to the longitudinal direction of the axis of the latter, the translational movement of the body in the volume of the spring continues until the abovementioned base butts against that coil of the spring that is located at the engagement end.

In this position, the body of the fixing bracket is held within the volume of the spring by the above-described radial stress which results from the natural elasticity of the material from which it is made and from the elasticity imparted by the presence of the fingers that are delimited by the longitudinal slots described above, and it is held longitudinally within the volume of the spring by the presence of the peripheral ribs described above, which are positioned substantially between the coils of the spring. The invention thus makes it possible to simply and effectively lock the fixing bracket to the drive arm of a wiper system, while ensuring, through the presence of the sleeve of the fixing bracket, simple and effective retention of a tube for delivering cleaning fluid toward that end of the drive arm that is intended to accommodate a windshield wiper of the abovementioned wiper system.

It clearly emerges from reading the above text that, via the configuration of the longitudinal slots and the fingers that they define, and also via the dimensions of its body, a fixing bracket as defined above can be used with various types of springs having, in particular, inner volumes of different diameters. This makes it possible to standardize such a fixing bracket, and therefore to reduce the cost of the drive arm and, more generally, of the wiper system.

The invention lastly extends, according to a third aspect, to a method for assembling a drive arm as described above, characterized in that it comprises a step of installing a fixing bracket as mentioned above in the volume of the spring of the drive arm prior to a step of mounting the spring, equipped with its fixing bracket, between the driver and the rod. Such a sequence of steps makes it possible to pre-assemble a sub-assembly constituted by the spring and the fixing bracket. This is advantageous because it is simpler to introduce the bracket into the volume delimited by the spring when the latter is accessible, this not being the case when the spring is attached to the driver and to the rod, and housed in the drive arm casing.

Other features, details and advantages of the invention will become more clearly apparent with the aid of the following description and of the drawings, in which:

FIG. 1 is a schematic view of a wiper system intended for wiping/cleaning a surface to be wiped of a motor vehicle, FIG. 2 is a partial perspective view of a drive arm of a wiper system, as illustrated in FIG. 1, FIG. 3 is a perspective view of a fixing bracket according to the first aspect of the invention, FIG. 4 is a sectional view of the fixing bracket of FIG. 3, in a plane containing its longitudinal direction, that is received in the volume of a spring of a drive arm as illustrated by FIG. 2.

It should first of all be noted that although the figures set out the invention in detail for implementing the invention, said figures may of course be used in order to better define the invention if necessary. It should also be noted that, in all of the figures, elements that are similar and/or perform the same function are indicated by the same reference.

With reference to FIG. 1, a wiper system 100 intended for a motor vehicle comprises a drive arm 1 configured to perform an angular back-and-forth movement against a surface to be wiped, which is not shown, of the vehicle. The drive arm 1 has an elongate shape in a main direction of extent, which is also referred to below as the longitudinal direction of the drive arm 1. At one of its ends in its longitudinal direction, the drive arm 1 is connected to a drive device 2 configured to impart the abovementioned angular back-and-forth movement to it. The drive device 2 comprises, for example, an electric motor. The drive arm 1 is connected to the drive device 2 by a driver 10 which is shown schematically in FIG. 1.

At its end 11 which is on the opposite side in its longitudinal direction, the drive arm 1 is connected to a windshield wiper 3 via a connecting device which is not shown in detail in FIG. 1. The windshield wiper 3 has in particular a blade rubber 30, which is schematically shown in FIG. 1 and is made of a flexible material. Driven in an angular back-and-forth movement against the surface to be wiped of the vehicle, the drive arm 1 in turn drives the windshield wiper 3 and its blade rubber 30 which, under the effect of this movement, rubs the surface to be wiped and removes water and any dirt that may interfere with the view that the driver of the vehicle has of their surroundings.

FIG. 2 shows more specifically a drive arm 1 according to the invention. This figure contains the driver 10 mentioned above. Furthermore, with reference to FIG. 2, the drive arm 1 comprises, at its opposite end from the end having the driver 10, in its main direction of extent, a yoke 12 intended to receive the abovementioned connecting device, which is not shown in FIG. 2. Between the driver 10 and the yoke 12, the drive arm 1 comprises an elongate rod 13, the main direction of elongation of which substantially coincides with the longitudinal direction of the drive arm 1. At one of its ends in its main direction of elongation, the rod 13 is connected to the yoke 12. At its end which is on the opposite side in its main direction of elongation, the rod 13 is connected to the driver 10 via a casing, which is not shown here, and via a spring 14.

The spring 14 is a wound-coil spring: in the example illustrated by FIG. 2, the spring 14 has a substantially cylindrical overall shape. All of the coils 140 which form the spring 14 delimit a volume 141 of the spring 14. The role of the spring 14 is essentially to exert, on the drive arm 1, a force the result of which is to ensure the windshield wiper 3 is held against the surface to be wiped, in order to prevent the blade rubber 30 from moving away from the surface to be wiped when the drive arm 1 is moving back and forth and when the vehicle is moving.

In the example illustrated by FIG. 2, a delivery tube 4 runs along the drive arm 1 substantially over the whole of the longitudinal dimension of the latter. In other words, the delivery tube 4 runs along the drive arm 1 from the driver 10 to the yoke 12.

The delivery tube 4 is configured to deliver a cleaning fluid to the yoke 12, with the aim of distributing this cleaning fluid at the windshield wiper 3 of the wiper system 100. In various examples, such a distribution may be performed by a spraying member assigned to the yoke 12 or by the connecting device received in the yoke 12, or the cleaning fluid may be distributed along the windshield wiper 3 and/or the blade rubber 30. In the latter case, the windshield wiper comprises a spray line which extends over all or some of its length.

In various examples, the cleaning fluid may be a liquid or a liquid mixture, a gas or a gas mixture, or a mixture of liquid and gas. Irrespective of its composition, the cleaning fluid is defined to efficiently and reproducibly clean and wipe the surface to be wiped in question in combination with the rubbing movement of the blade rubber 30.

In one example, the assembly formed by the rod 13, the spring 14 and the delivery tube 4 is, in the region of the spring 14, received in the casing, which is not shown in FIG. 2. The casing is advantageously configured to extend in continuation of the rod 13 and the driver 10, in order to form a substantially continuous surface with these elements, while protecting the spring 14 and the delivery tube 4 in this region of the drive arm 1.

FIG. 2 also shows a fixing bracket 5 according to a first aspect of the invention, configured to mechanically link the delivery tube 4 to the drive arm 1 in order, in particular, to avoid any premature wear of the delivery tube 4. As is shown in FIG. 2, the fixing bracket 5 is advantageously positioned at the end of the spring 14 via which the latter is connected to the driver 10.

FIG. 3 is a schematic perspective view of a fixing bracket 5 as can be seen in FIG. 2.

With reference to FIG. 3, the fixing bracket 5 comprises a substantially conical hollow body 50 having an axis 500, and a sleeve 51. With reference to the orientations and designations defined above, the direction of the axis 500 of the body 50 represents the longitudinal direction of the body 50 and, by extension, the longitudinal direction of the fixing bracket 5 and of the elements which constitute it. Advantageously, the fixing bracket 5 is made by injecting an inexpensive synthetic material, such as, for example, a polypropylene or a polyethylene, into a mold.

The sleeve 51 has substantially the shape of a hollow cylinder, the axis 510 of which is substantially parallel to the longitudinal axis 500 of the body 50 of the fixing bracket 5.

As is shown in FIG. 3, the sleeve 51 has an opening 511 which extends parallel to the abovementioned axis 510, from one longitudinal end of the sleeve 51 to the longitudinal end thereof that is on the opposite side. More specifically, in the example illustrated more particularly by FIG. 3, the opening 511 is arranged in such a way that a longitudinal plane 600 containing the axis 500 of the body 50 and the axis 510 of the sleeve 51 passes through the middle of the opening 511, in a direction perpendicular to the abovementioned plane 600. In other words, a longitudinal plane 600 as mentioned above is the median longitudinal plane of the opening 511, and more generally of the fixing bracket 5.

Advantageously, in a drive arm 1 as illustrated by FIG. 2, the inside diameter of the cylinder formed by the sleeve 51 is substantially equal to an outside diameter of the delivery tube 4, in such a way that the latter can be received and held by snap-fastening, by virtue of the opening 511 described above, in the space 512 of the hollow cylinder formed by the sleeve 51.

According to the embodiment illustrated by FIG. 3, the sleeve 51 is connected to the body 50 via a base 52 which is perpendicular, or substantially perpendicular, to the axis 500 of the body 50 and to the axis 510 of the sleeve 51. The base 52 which mechanically links the sleeve 51 to the body 50 of the fixing bracket 5 is arranged at a longitudinal end 50a of the body 50 that is referred to, with reference to the orientations and designations defined above, as rear longitudinal end 50a of the body 50 and of the fixing bracket 5.

With reference to FIG. 3, the body 50 of the fixing bracket 5 has a substantially conical overall shape, having an axis 500, the diameter of which shape increases from the rear end 50a of the body 50 toward the front end 50b of the latter, the front end 50b of the body 50 being the opposite end thereof, in the longitudinal direction of the axis 500, from the abovementioned rear end 50a.

More specifically, in a drive arm 1 according to the invention as illustrated by FIG. 2, a diameter of the body 50, measured close to its front end 50b, is greater than a diameter of the above-defined volume 141 that is delimited by the coils 140 of the spring 14 of the drive arm 1.

In the example illustrated more particularly by FIG. 3, the body 50 of the fixing bracket 5 comprises three longitudinal slots 53 arranged parallel to the axis 500 of the body 50, starting from the front end 50b thereof. The longitudinal slots 53 are therefore substantially parallel to one another, and they each open out at the front end 50b of the body 50. The longitudinal slots 53 are, moreover, evenly angularly distributed over the circumference of the body 50 or, in other words, about the axis 500 thereof, and they have substantially the same dimensions in the longitudinal direction defined above. As is shown in FIG. 3, a longitudinal dimension of each longitudinal slot 53 is smaller than a longitudinal dimension of the body 50, that is to say that the longitudinal slots 53 do not open out at the rear end 50a of the body 50.

As is shown in FIG. 3, a dimension of each longitudinal slot 53, measured around the perimeter of the body 50, decreases from the front end 50b toward the rear end 50a of the body 50. In other words, measured in a plane 700 perpendicular to the axis 500 of the body 50, the fraction of the perimeter of the body 50 that is occupied by a longitudinal slot 53 becomes smaller as the aforementioned plane 700 gets longitudinally closer to the rear end 50a of the body 50.

In pairs, the longitudinal slots 53 delimit between them fingers 54, each of which has the shape of a portion of a cone frustum. The result of the shape and dimensions of the longitudinal slots 53 is that the portion of the perimeter of the body 50, measured in a plane 700 as defined above, that is occupied by a finger 54 increases from the front end 50b of the body 50 toward the rear end 50a of the latter. The result of the elasticity of the material used to make the fixing bracket 5 and of the configuration of the longitudinal slots 53 is that the fingers 54 can, under the effect of stress exerted radially with respect to the axis 500 of the body 50 and directed toward the axis 500 of the latter, move closer to the abovementioned axis 500. In the course of such a movement, the fingers 54 move closer to one another, thereby reducing the diameter of the body 50 at the front end 50b thereof.

As is shown in FIG. 3, the body 50 of the fixing bracket 5 also comprises a plurality of peripheral ribs 55, substantially parallel to one another and arranged protruding from an outer surface 50c of the body 50. In the example illustrated by FIG. 3, the peripheral ribs 55 are substantially circular, and they extend substantially in planes that are perpendicular to the longitudinal axis 500 of the body 50. As is shown in FIG. 3, the peripheral ribs 55 are arranged on that part of the body 50 in which the longitudinal slots 53 described above are made. In other words, the peripheral ribs are arranged on the fingers 54 mentioned above. In the example illustrated more particularly by FIG. 3, there are six peripheral ribs 55.

The body 50 of the fixing bracket 5 also comprises, at its front end 50b, a bevel 56. As is shown in FIG. 3, the bevel 56 is made by thinning the wall forming the body 50 at the front end 50b of the latter. In other words, the wall of the body 50 has, close to the front end 50b of the latter, a conical shape the smallest diameter of which is located at the front end 50b of the body 50, which also constitutes, with reference to the designations and orientations defined above, the front end of the bevel 56. In a drive arm 1 according to the invention as illustrated by FIG. 2, an outside diameter of the body 50 at the front end of the bevel 56 is advantageously smaller than a diameter of the volume 141 of the spring 14 described above. A diameter of the body 50 at the rear end of the bevel 56 closest, in the longitudinal direction of the fixing bracket 5, to the rear end 50a of the body 50 is advantageously greater than a diameter of the abovementioned volume 141.

FIG. 4 shows a sectional view, in a plane containing the axis 500 of the body 50 and the axis 510 of the sleeve 51, of the fixing bracket 5 as illustrated in FIG. 3, which fixing bracket is inserted in the volume 141 of a spring 14 of a drive arm 1 as illustrated by FIG. 2.

Such insertion is carried out, in a first step, by engaging the front end 50b of the body 50 of the fixing bracket 5 in an engagement end 141a of the volume 141 of the spring 14. More specifically, the bevel 56 described above is first of all engaged in the engagement end 141a. This engagement is facilitated by the presence of the bevel 56 and by the dimension of the front diameter of the latter, which is smaller than an inside diameter of the volume 141 of the spring 14 as indicated above.

The insertion of the body 50 of the fixing bracket 5 in the abovementioned volume 141 continues with a relative translational movement of the body 50 of the fixing bracket 5 with respect to the spring 14, in the longitudinal direction of the body 50. The direction of this translational movement is illustrated by the arrow F in FIG. 4; it is directed from the engagement end 141a of the volume 141 toward the inside of the latter. It should be noted that, as is shown in FIG. 4, during this translational movement, the axis 500 of the body 50 of the fixing bracket 5 and a main axis 145 of extent of the spring 14 and of the volume 141 surrounded by all of the coils 140 of the spring 14 substantially coincide.

During this translational movement, the coils 140 of the spring 14 exert, on the body 50 of the fixing bracket, a stress directed radially toward the longitudinal axis 500, 145, common to the body 50 and to the spring 14: a direction of this stress is illustrated by the arrows F1 in FIG. 4. The result of the elasticity of the material constituting the fixing bracket 5, and also the presence of the longitudinal slots 53 described above, is that, under the effect of the abovementioned radial stress, the fingers 54 of the body 50 move radially toward the abovementioned common axis 500, 145, leading to a reduction in the outside diameter of the body 50 and thus making it possible to slide the latter within the volume 141 of the spring 14.

According to the example illustrated by FIG. 4, the abovementioned translational movement continues until the base 52 via which the sleeve 51 is attached to the body 50 of the fixing bracket 5 butts against the end coil 140a located at the engagement end 141a defined above. In this position, the result of the elasticity of the material constituting the fixing bracket 5 and the presence of the longitudinal slots 53 is that the fingers 54, having a natural tendency to return to their initial position, tend to move away from the axis 500, 145 common to the body 50 and to the spring 14 by exerting, on the coils 140 of the spring 14, a radial stress directed away from the common axis 500, 145. These radial stresses are illustrated by the arrows F2 in FIG. 4. The radial dimensions of the body 50 and of the diameter of the volume 141 then result in the body 50 of the fixing bracket 5 being locked within the abovementioned volume 141. The body 50 is longitudinally locked in the volume 141 by the peripheral ribs 55 described above, the latter playing the role of teeth that are partially inserted, in radial directions, between the coils 140 of the spring 14, as is shown in FIG. 4.

The invention, as it has just been described, therefore makes it possible, by virtue of a fixing bracket 5 as illustrated in FIG. 3, to mechanically link a cleaning-fluid delivery tube 4 to a drive arm 1 of a wiper system 100 in a simple manner. Furthermore, the configuration of the sleeve 51 of the fixing bracket 5 makes it possible to simply and effectively retain the delivery tube 4. By virtue of the insertion of the body 50 of the fixing bracket 5 in the volume 141 of a spring 14 of the drive arm 1, the invention makes it possible to reduce the bulk of this mechanical link. Furthermore, the configuration and the dimensions of the body 50 of the fixing bracket 5 and, in particular, the presence of the longitudinal slots 53 described above make it possible to use the fixing bracket with various springs 14, the diameters of the volume 141 of which can vary. The invention therefore makes it possible to reduce the cost of manufacturing a drive arm 1 as illustrated by FIG. 2.

The invention is not limited to the means and configurations described and illustrated, however, and also applies to all equivalent means or configurations and to any combination of such means. In particular, if the invention has been described according to an example in which the body 50 of the fixing bracket 5 comprises three longitudinal slots 53, it goes without saying that the invention applies irrespective of the number, which is greater than two, of longitudinal slots 53, inasmuch as the latter are angularly distributed about the axis 500 of the abovementioned body 50.

The invention claimed is:

1. A fixing bracket for fixing a fluid delivery tube to a drive arm of a wiper system of a motor vehicle, the drive arm comprising a spring, the fixing bracket comprising:
   at least one sleeve configured to retain the delivery tube external to a volume surrounded by the spring of the drive arm; and
   a cylindrical body that is linked to the sleeve via a base at a rear longitudinal end of the body and forms a gap separating from the sleeve along an entire length of the body starting from the rear longitudinal end,
   wherein the cylindrical body is configured to be inserted, based on the gap between the sleeve and the body, in the volume surrounded by the spring of the drive arm, and
   wherein a longitudinal central axis of the at least one sleeve and a longitudinal central axis of the body are offset from each other and substantially parallel to each other.

2. The fixing bracket as claimed in claim 1, wherein the at least one sleeve extends along a main direction substantially parallel to that of the body of the fixing bracket.

3. The fixing bracket as claimed in claim 1, wherein the body has a conical shape.

4. The fixing bracket as claimed in claim 1, wherein the body comprises at least one longitudinal slot configured to give it radial elasticity.

5. The fixing bracket as claimed in claim 1, wherein, in a rest position of the fixing bracket, a diameter of the body of the fixing bracket measured at a front longitudinal end of the latter is greater than a diameter of the body measured at a rear longitudinal end of the body.

6. The fixing bracket as claimed in claim 5, wherein the front longitudinal end of the body comprises a bevel.

7. The fixing bracket as claimed in claim 1, wherein the body comprises a plurality of radially arranged peripheral ribs.

8. A drive arm of a wiper system for a motor vehicle, comprising:
   a driver configured to be linked to a device for driving the drive arm, an end configured to receive a windshield wiper of the wiper system;
   the spring linked, on one end, to the driver and, on the other end, to a rod connected to the end that is configured to receive a windshield wiper;
   the fluid delivery tube for delivering a cleaning fluid to the windshield wiper of the wiper system; and
   the fixing bracket for fixing the fluid delivery tube as claimed in claim 1.

9. A wiper system for a motor vehicle, comprising:
   the drive arm as claimed in claim 8; and
   the windshield wiper borne by one end of the drive arm.

10. A method for assembling a drive arm as claimed in claim 8, the method comprising:
    installing the fixing bracket in the volume of the spring of the drive arm; and
    mounting the spring, equipped with the fixing bracket, between the driver and the rod.

* * * * *